United States Patent [19]

Blahut et al.

[11] Patent Number: 5,446,490
[45] Date of Patent: Aug. 29, 1995

[54] INTERACTIVE TELEVISION WITH TAILORED PROGRAMMING

[75] Inventors: Donald E. Blahut, Holmdel; Edward S. Szurkowski, Maplewood, both of N.J.

[73] Assignee: AT&T Corp., Murray Hill, N.J.

[21] Appl. No.: 965,493

[22] Filed: Oct. 23, 1992

[51] Int. Cl.⁶ ............................................. H04N 7/10
[52] U.S. Cl. .................................. 348/7; 348/10; 348/12; 455/4.2; 455/5.1; 455/6.2
[58] Field of Search ............... 358/86; 455/3.1, 4.1, 455/4.2, 5.1, 6.1, 6.2, 6.3; 348/6, 7, 8, 10, 12, 13, 11

[56] References Cited

U.S. PATENT DOCUMENTS

| | | | |
|---|---|---|---|
| 4,506,387 | 3/1985 | Walter | 358/86 |
| 4,780,757 | 10/1988 | Bryer et al. | 358/86 |
| 4,787,085 | 11/1988 | Suto et al. | 358/86 |
| 4,890,320 | 12/1989 | Monslow et al. | 455/4.2 |
| 4,975,771 | 12/1990 | Kassatly | 358/86 |
| 5,206,722 | 4/1993 | Kwan | 348/7 |

OTHER PUBLICATIONS

W. D. Sincoskie, "System architecture for a large scale video on demand service" *Computer Networks and ISDN Systems*, 22 (1991) 155–162.

Primary Examiner—Edward F. Urban
Assistant Examiner—Nguyen Vo
Attorney, Agent, or Firm—Geoffrey D. Green; David M. Rosenblatt

[57] ABSTRACT

Different components of television programs, such as the video and audio components or different time segments of the program, are assigned to different channels transmitted in the form of packetized digital information in at least one of the channels of a multi-channel cable television distribution system. A particular subscriber's converter is configured to receive a particular subset of program components by enabling the converter to receive the virtual channels carrying the components in such subset. An embodiment is disclosed in which different combinations of program segments are enabled for different subscribers. Another embodiment is disclosed in which the viewing of a program by multiple subscribers who begin viewing at different times is synchronized by using "filler" program segments having different lengths.

4 Claims, 3 Drawing Sheets

INTERACTIVE TELEVISION WITH TAILORED PROGRAMMING

TECHNICAL FIELD

This invention relates to interactive television systems and more particularly to methods and apparatus by which a subscriber to an interactive television service can receive specifically tailored programs assembled from program segments broadcast throughout a cable television system.

BACKGROUND OF THEN INVENTION

Cable television systems have made possible the transmission of many channels of television programs to the homes of subscribers. Instead of being limited to the number of VHF and UHF channels that can be transmitted and received in a given area, the number of channels in cable systems is limited only by the transmission characteristics of the cable itself and the ability to compress the information in television programs into narrower-bandwidth channels. The advent of fiber-optic transmission systems for use in cable television networks has also vastly increased the number of channels available.

Such increase in channels has also given rise to proposals for interactive television systems wherein a subscriber can transmit information or requests back into the system, which information or requests may subsequently affect programs or information directed to such subscriber. There are a wide variety of applications for interactive television systems, such as video games, video catalog shopping, teaching systems, movies on demand and audio programs. Each application can be tailored for an individual subscriber, for example, a subscriber may be able to select the language of the soundtrack in a movie. However, such systems typically require the ability (i) to control specific programs or information sent to each subscriber and (ii) to receive input messages or requests from the subscriber.

A headend-to-subscriber channel does not need the full bandwidth of the usual television cable channel if compression can be used. For example a number of compressed and digitized television signals can be transmitted over a single conventional 6 Mhz cable channel. Other program information, such as high-fidelity audio, still video pictures or text can also be sent in compressed form. By using a large number of conventional channels for 1TV purposes, such as is now possible with optical fiber distribution systems, together with compression, it is conceivable that hundreds of virtual channels could be made available.

Even with such a large number of channels, it may not be possible to transmit a different program from the cable headend to each subscriber. However, the needs of subscribers may overlap. For example, a number of subscribers may wish to view the same movie, but at different times, or with sound tracks in different languages. There may also be applications where it is desired to transmit different combinations of program segments to different subscribers, but where at any given time, a particular program segment is being transmitted to more than one subscriber. One example of such an application is the transmission of different commercial messages to different subscribers watching the same program. Other examples are applications in which one or more segments of a program has alternatives and subscribers are given the ability to interactively select particular alternatives for a given segment. For example, a movie could be made with multiple ratings for different audiences, but with only certain segments that are critical for the ratings needing to be different. Still other examples are applications where subscribers have the ability to select program segments as the program progresses; for example, a subscriber may be able to select among different endings to a movie.

In many cable television systems, a special converter is used at the subscriber location to allow the subscriber to select among the various available channels, and possibly to "unscramble" premium channels for which extra fees are payable. Such converters usually provide an output on one of the channels that a standard television receiver can receive, such as Channel 3. More recently, television receivers and video recorders have been made available that are "cable ready," that is, with the ability to receive and select among all the channels transmitted over the cable system, but without the ability to unscramble premium channels. A converter is still needed for the premium channels.

Many cable-ready television receivers have additional features, such as picture-within-picture and remote-control tuning, that cannot be used conveniently with cable converters that provide an output over a single channel. Similarly, video recorders capable of being programmed to record selected channels at selected times are defeated by such a converter. Accordingly, it is desired to provide a converter for use in interactive television systems that is "transparent" to unrestricted channels on the cable system and that permits use of cable-ready features on television receivers and video recorders.

SUMMARY OF THE INVENTION

One or more channels in a multi-channel cable television distribution system are used for the transmission of interactive television (ITV) signals in the form of packetized digital information from the cable system headend to subscribers. A converter at each subscriber location is connected between the cable system and the subscriber's television receiver. Such converter contains a receiver for the ITV channels. Control packets in the ITV signals are addressed to individual converters to enable the receipt of one or more virtual channels by a converter. The converter decodes and expands the packetized digital information in such enabled channels and generates a conventional video signal, which is transmitted to the subscriber's television receiver on one of the channels used for the ITV signal from the headend, replacing the packetized digital information.

Different components of television programs, such as the video and audio components or different time segments of the program, are assigned to different virtual channels. A particular subscriber's converter is configured to receive a particular subset of program components by enabling the converter to receive the virtual channels carrying the components in such subset. An embodiment is disclosed in which different combinations of program segments are enabled for different subscribers. Another embodiment is disclosed in which the viewing of a program by multiple subscribers who begin viewing at different times is synchronized by using "filler" program segments having different lengths.

These and other aspects of the invention will become apparent from the attached drawings and detailed description.

DETAILED DESCRIPTION

Figure 1:
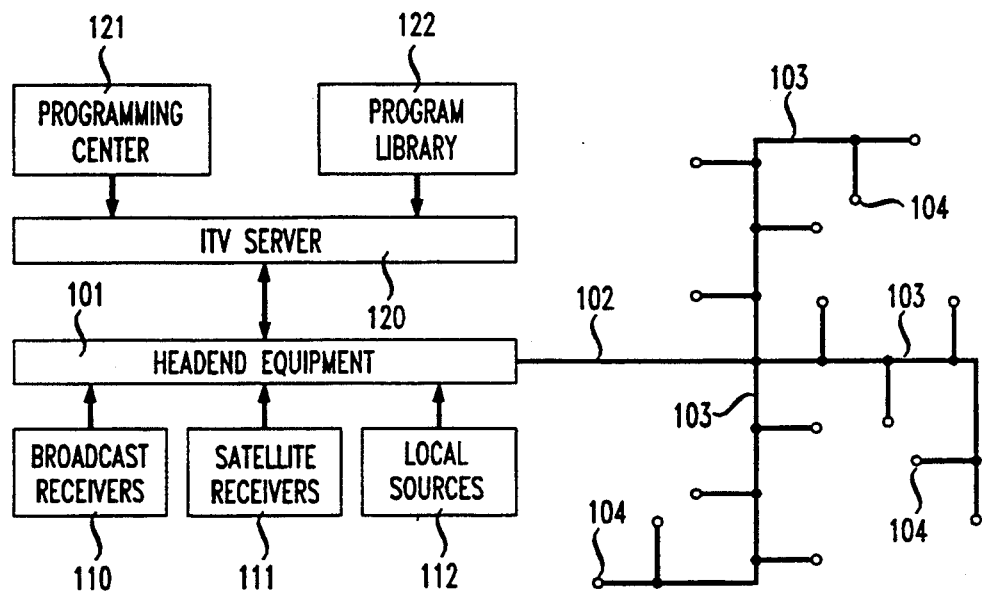
FIG. 1 is a schematic block diagram of a cable television system adapted for use by an interactive television system in accordance with the invention.

FIG. 1 is a schematic block diagram of a cable television system adapted for use by an interactive television system in accordance with the invention. A typical cable television system comprises headend equipment 101 at a central location, a distribution network consisting of various feeders 102 and branches 103 and connections to subscriber locations such as 104, where converters and television receivers (or cable-ready television receivers alone) receive the signals from the distribution network. In a typical cable television system, various television programs are fed into the different channels of the system by headend equipment 101. Such programs may be received, for example, from local broadcasts by broadcast receivers 110, from communications satellites by satellite receivers 111 or directly from local sources 112.

Interactive television (ITV) subscribers are served via dedicated distribution channels of the cable television system from ITV server 120. Server 120 obtains its programming material from such sources as programming center 121, or program library 122. Program library 122 contains stored versions of movies, musical selections, texts, pictorial information and other materials that may be accessed by ITV subscribers in conjunction with an ITV service or application. Programming center 121 may be a direct source of program material for server 120 or may prepare such material for library 122.

ITV server 120, programming center 121 and program library 122 may be at the same or different locations and may themselves be connected in networks. There can be multiple servers 120 for different cable systems. Program library 122 may consist of a number of libraries at different locations. However, there will typically be a server 120 dedicated to a particular cable system to interact with the ITV subscribers on that systems distribution network.

There arc a wide variety of possible configurations for server 120, all of which will typically include at least one central processor to control programs and other information transmitted to subscribers 104 over the dedicated ITV channels in the cable system and to receive and respond to uplink messages from subscribers 104.

Using well-known compression techniques, a number of full-motion television signals can be transmitted in packetized form over a cable channel in a cable television system. For example, a full-motion NTSC television signal can be compressed and digitized for transmission at 1.5 Mbits/second. By packetizing such digital information and interleaving such packets, it is possible that as many as 16 such television signals (24 Mbits/second) can be sent via "virtual channels" in a standard 6 MHz cable channel. If a lower bandwidth signal (such as an audio signal) is to be sent over a virtual channel, fewer packets need be transmitted for such virtual channel per unit of time.

A typical packet consists of two bytes for a polling address, two bytes identifying the virtual channel of which the packet is a part and 48 data bytes. The data bytes contain the compressed video, audio or other information being transmitted in the virtual channel. One virtual channel (for example, channel 00) is reserved for control messages. A typical control message includes a field containing the address of the converter for which the message is intended, a field identifying the virtual channel to which the message relates, a field specifying the kind of data to be transmitted on such virtual channel (i.e. still pictures, full motion video, stereo audio, text) and other control information. A television signal is typically transmitted over two virtual channels: one for the video portion, the other for the audio. Control messages are also used to initialize converters.

Figure 2:
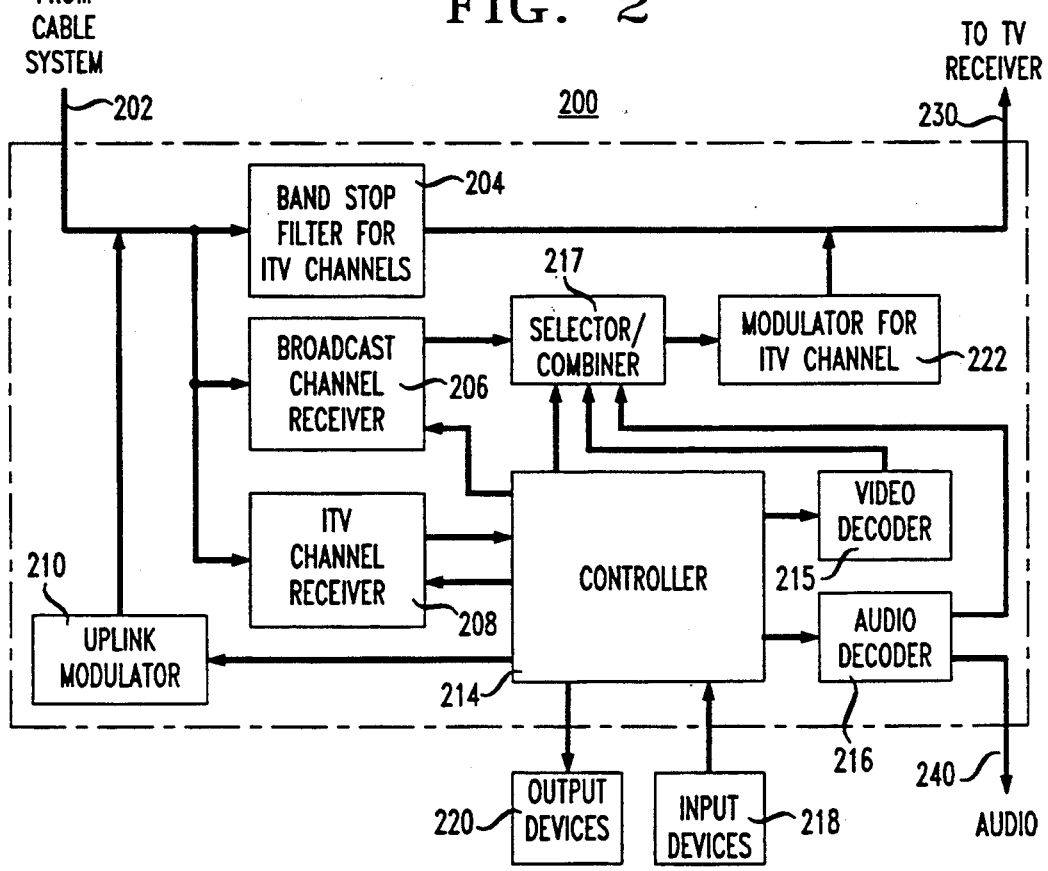
FIG. 2 is a block diagram of a converter for use at subscriber locations of an interactive television system.

FIG. 2 is a block diagram of a converter 200 for connection between a cable system and a television receiver at a subscriber's premises. Input cable 202 is typically a coaxial cable or an optical fiber cable connected to the cable distribution system. Cable 202 is connected to inputs of band-stop filter 204, selectable channel receiver 206 and ITV channel receiver 208 and to the output of uplink modulator 210. Cable 202 is part of an input circuit (not shown) that also contains any interface apparatus, such as optical/electrical transducers and amplification and buffering circuits needed to connect the cable system to filter 204, receivers 206 and 208 and modulator 210. Such interface apparatus and amplification and buffering circuits are well known to those skilled in the art.

ITV channel receiver 208 is tuned to receive the cable channel over which the packetized digital information for the interactive television features is being transmitted. The actual cable channel or channels used for such purpose are assigned by the administrators of the cable system. If more than one such ITV channel is provided, one of the channels is usually considered the "default" channel, which is the channel used to initialize converters such as converter 200. Upon initialization, a converter can be transferred to a different ITV channel by means of a control message. The output of tuner 208 is a digital bit stream comprising the packetized digital information, which is forwarded to controller 214.

Controller 214 performs many functions and is typically a microprocessor with both random-access memory (RAM) and read-only memory (ROM). Controller 214 sends control and video information to selector/combiner 217, sends control messages to receivers 206 and 208 specifying the identity of channels to be received, receives manual inputs from manual input devices 218, sends video packets to decoder 2 15 and audio packets to decoder 216, and transmits information to the cable headend via uplink modulator 210. An audio packet can contain information for more than one audio channel. Controller 214 can also be a source of audio and/or video information. Such information can be retrieved from memory in controller 214 or generated by computer programs in controller 214 under the control of messages from receiver 208 or input devices 218. Examples of such information are symbols, icons, text or other stored images to be used as video overlays or synthesized sounds to be combined with audio signals.

Decoders 215 and 216 can also be microprocessors, such as digital signal processors, specifically programmed to decode compressed video or audio information, as the case may be, in accordance with the appropriate decoding algorithm, as is well known in the art. Other output devices 220 capable of receiving digital information, such as a printer, can be connected to controller 214 as desired.

The output of selector/combiner 217 is a television signal, the components of which can be either (i) selected from one of a number of sources, such as receiver 206, controller 214, decoder 215 or decoder 216 or (ii) combined from such sources. In its simplest form, selector/combiner 217 forwards to modulator 222 either the television signal received by receiver 206 or the television signal obtained by combining video decoded by decoder 215 with audio decoded by decoder 216. Other versions of combiner 206 can include apparatus controlled by controller 214 to combine various video and audio sources into the television signal to be transmitted to modulator 222. Many techniques are known in the art for combining video sources, such as overlays, windows and split screens.

Selector/combiner 217 operates on digital representations of video signals in which each pixel of a scene is represented by a number of bits and on digital representations of audio signals in which sounds are represented by digital samples. The outputs of decoders 215 and 216 and any audio or video outputs from controller 214 are in digital form; also, the television signal from receiver 206 is converted to digital form in converting apparatus (not shown). Such converting apparatus is well known in the art. These digitized video and audio elements are combined in selector/combiner 217 to produce a sequence of digital frames and digital audio samples (possibly for more than one audio channel). These samples are then converted to a conventional television signal, such as an NTSC signal, by apparatus (not shown) also well known in the art.

Band stop filter 204 deletes at least one of the ITV channels, preferably the default channel, from the signal received from cable 202, passing the remaining channels to output cable 230. Modulator 222 modulates the television signal received from selector/combiner 217 into one of the blocked ITV channels on output cable 230. Thus, converter 200 replaces the packetized digital signal received from the cable system in such ITV channel with the television signal from selector/combiner 217. Such ITV channel can then be selected and viewed in the conventional way on a cable-ready television receiver connected to output cable 230. As described above, the television signal modulated into such ITV channel can be produced from ITV packets received over any of the ITV channels.

For applications in which audio programs are transmitted over an ITV channel, a separate audio output can be provided, as shown at 240, which can be used by equipment such as a high-fidelity sound system. Such audio output can have more than one channel, if desired.

As mentioned above, each packet received in an ITV cable channel contains identification of a virtual channel. Program information can be "multicast" on virtual channels for receipt by one or more subscribers. As also mentioned above, control messages are sent over at least one of the virtual channels not being used for program information. Different types of programs can be transmitted in each virtual channel; for example, full motion video, still pictures, audio or text. When converter 200 is to receive a program from a virtual channel, a control message addressed to converter 200 causes controller 214 to store the identification of such virtual channel. Thereafter, controller 214 processes the contents of each packet identified as part of such virtual channel. Moreover, controller 214 can be set to process information in more than one virtual channel, if desired. For example, the audio and video portions of a movie can be sent simultaneously on different virtual channels, possibly with soundtracks in different languages on different channels.

Other uses of multiple virtual channels for a single subscriber can be sequential in nature. For example, it may be desired to transmit different sequences of program segments to different subscribers. To accomplish this, the segments are sent over different virtual channels in the correct time sequence, and the virtual channels corresponding to the sequence of segments for a particular subscriber are enabled for that subscriber. Transitions between segments are synchronized so that at the end of one segment the next begins. Multicasting will be described in more detail below.

Figure 3:
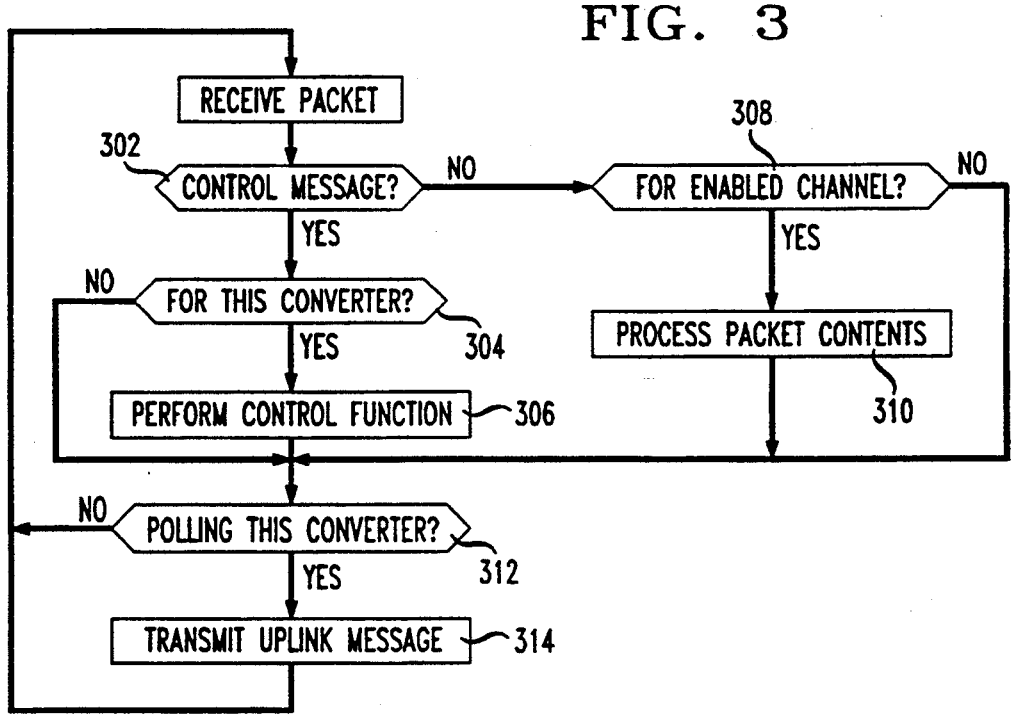
FIG. 3 is a flow chart showing the operation of controller 114 in FIG. 2 upon receipt of a packet of information from the cable system.

FIG. 3 is a flow chart showing the overall operation of controller 214 on receipt of a packet from receiver 208. If the "virtual channel" bytes indicate that such packet is a control message, (block 302) and the address field in the control message indicate that the message is intended for converter 200 (block 304), then controller 214 performs the control function specified by the remaining contents of the message (block 306). If the "virtual channel" bytes indicate that such packet is part of a program channel, such as a channel carrying an encoded and digitized video signal, and controller 214 is currently enabled to receive from such virtual channel (block 308), then controller 214 processes the packet contents in accordance with the type of program in such virtual channel (block 310), sending data from the packet to the input buffer in the appropriate output device, such as decoder 215 or decoder 216.

Each packet in which the "polling address" bytes indicate that converter 200 is being polled (block 312) causes such converter to transmit an uplink message the cable headend (block 314). (The address in the "polling address" bytes is not necessarily the same as in the address field in a control message that may be included in the same packet). This uplink message, typically no more than a few bytes, can contain control information or information entered manually by the subscriber in one of manual input devices 218. Because this message is initiated by a downlink message (from the headend to the converter) having an address known at the headend, this address can be associated with the uplink message when received, and there is no need to identify the source of uplink messages.

Uplink messages can be used for a number of purposes, particularly in interactive situations such as selection programs or program sequences. Polling and the use of uplink messages for other purposes, such as initialization and verification purposes, are described in more detail in U.S. Pat. No. 5,373,288 issued Dec. 13, 1994.

As mentioned above, controller 214 can contain both RAM and ROM. The ROM includes computer programs that can be permanently loaded, such as initialization routines; whereas the RAM can be downloaded from the headend by the use of control messages. Such downloading will typically occur when a converter is first connected to the cable system or when programs must be updated. Also, different programs for different purposes can be downloaded in controller 214 at different times. Such downloading capability eliminates the need for program-loading capabilities at converter 200, although such capability could be provided if desired.

Converter 200 forms a facility dedicated to the subscriber, and in many applications it will be most convenient to have the functions of converter 200 performed at the subscriber's location, as has been described. However, it is possible, and may be desirable for some applications, to perform all or part of such functions at a central location, for example, at the cable head end or in a telephone central office. Such an approach may permit sharing some of the functions and reducing the amount of dedicated equipment. However, for the kinds of applications presently contemplated, such an approach requires at least some equipment dedicated to each subscriber at the central location and dedicated channels from the central location to the subscriber for at least one video signal and stereo audio signals. In the case of a cable television system, such dedicated channels can be virtual channels as described above and converter 200 at the subscribers location can be simplified to receive and decode only such dedicated channels. All the functions relating to channel selection can be performed at the central location.

When a subscriber becomes inactive, the equipment and channels reserved for such subscriber can be reassigned to a new subscriber. Thus, dedicated equipment and channels are needed only for the number of subscribers expected to be active simultaneously.

Figure 4:
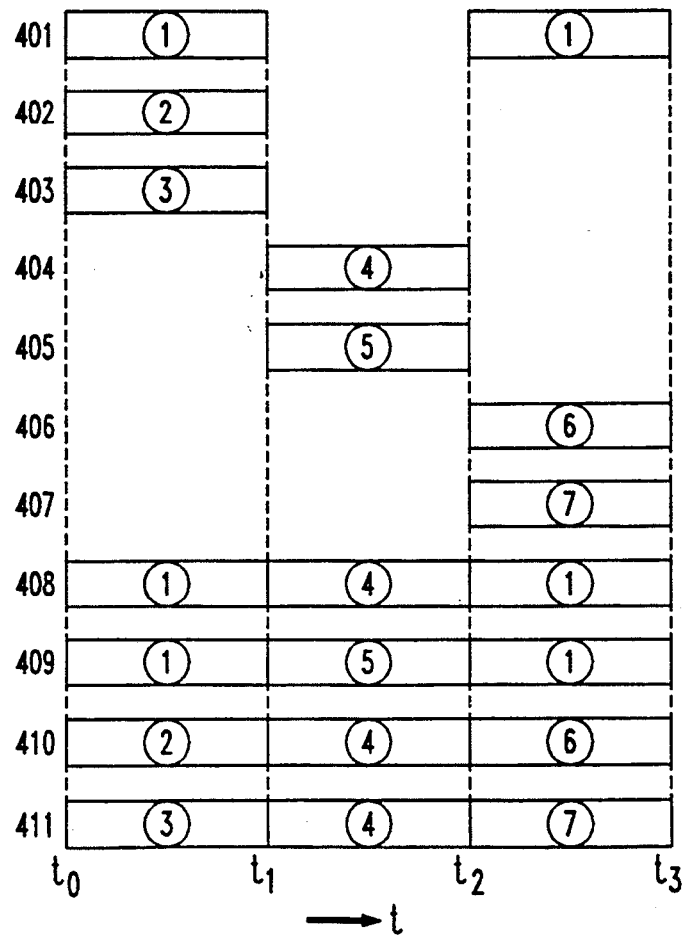
FIGS. 4 and 5 are diagrams showing various time relationships among program segments in a multicasting environment.

FIG. 4 is a graph showing time relationships among various program segments in different virtual channels in a multicasting environment wherein different combinations of program segments are transmitted to different subscribers. The circled numerals relate to virtual channel numbers. For example, line 401 shows two program segments being transmitted in virtual channel 1, a first segment being transmitted between $t_0$ and $t_1$ and a second segment between $t_2$ and $t_3$. Lines 402–407 show single program segments being transmitted at various times in virtual channels 2-7, respectively. The starting times, ending times and relative lengths of the time periods shown are arbitrary and are for illustration only.

As mentioned above, a converter can be enabled for more than one virtual channel at a time. Lines 408–411 show combinations of program segments received by different subscribers for whom different combinations of virtual channels are enabled. For example, line 408 shows that a subscriber having virtual channels 1 and 4 enabled will receive virtual channel 1 during the period from $t_0$ to $t_1$, virtual channel 4 during the period from $t_1$ to $t_2$ and virtual channel 1 during the period from $t_2$ to $t_3$. Line 409 shows that a subscriber having virtual channels 1 and 5 enabled will receive from virtual channels 1, 5 and 1, respectively, during such periods. Such an arrangement could result where virtual channel 1 is carrying a television program and virtual channels 4 and 5 are carrying different sets of commercials. Lines 410 and 411 show sequences of program segments that could result when three virtual channel segments are enabled for different subscribers.

It should be emphasized here that there can be many more virtual channel identities assigned and enabled than the number of actual virtual channels that can be active at any given time. For example, seven different virtual channels are identified in FIG. 4 but no more than they are being used at any one time. The number of active virtual channels is limited by the bandwidth of the distribution system, but the number of identities is limited, for practical purposes, only by the capacity of the memory elements storing virtual channel identities and the lengths of control messages enabling virtual channels.

Figure 5:
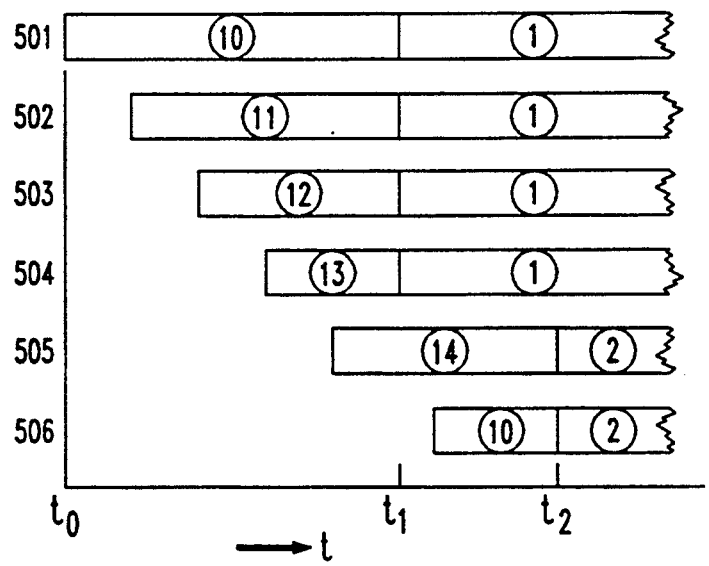

FIG. 5 shows programming segments in another multicasting application where the same program is to be received by a number of subscribers but with staggered starting times. An example of such an arrangement is an interactive television system wherein a subscriber can request a movie for viewing. During a given time period, many requests to view a currently popular movie might be received, but at different times. It is desirable to respond to a subscriber's request by starting the movie without delay, but it is not desirable to fill up virtual channels with too many time-staggered versions of the same movie. Thus, a number of different versions of the starting portion of the movie are made, each having a different length, which can be used as "fillers" for use between the time a request is received and the time the main portion of the movie is next scheduled to begin. The fillers are of different incremental lengths. For example, if five different fillers are made with lengths of two, three, four, five, six and seven minutes, then the main portion of the movie will never need to be started more frequently than every five minutes, but the wait for the start as seen by the viewer will never be more than one minute.

Referring to FIG. 5, lines 501–506 illustrate responses by server 120 to requests received at staggered times for showings of a movie. The first request (line 501) at time to starts the longest filler on virtual channel 10 and schedules a start of the main portion of the movie at time $t_1$ (when such filler is finished) on virtual channel 1. Virtual channels 1 and 10 are enabled at the requesting subscriber's converter. The subsequent requests (lines 502–504), which occur more than the time of the shortest filler before $t_1$, have successively shorter fillers scheduled in virtual channels 11, 12 and 13, respectively, and the appropriate virtual channels are enabled for the requesting subscribers. The request in line 505 is too late for the shortest filler to run before the showing of the main portion starting at $t_1$, so the longest filler is started again on virtual channel 14 and a new showing of the main portion is scheduled to start at $t_2$ on virtual channel 2, and virtual channels 2 and 14 are enabled for the requesting subscriber in line 505. The request in line 506 also makes use of virtual channel 2 for the main portion, but the filler for such request can reuse channel 10, since the use of that channel shown in line 501 is completed. However, before channel 10 is reused, control messages are sent to disable such channel for subscribers who were receiving such channel during the time period shown in line 501.

Figure 6:
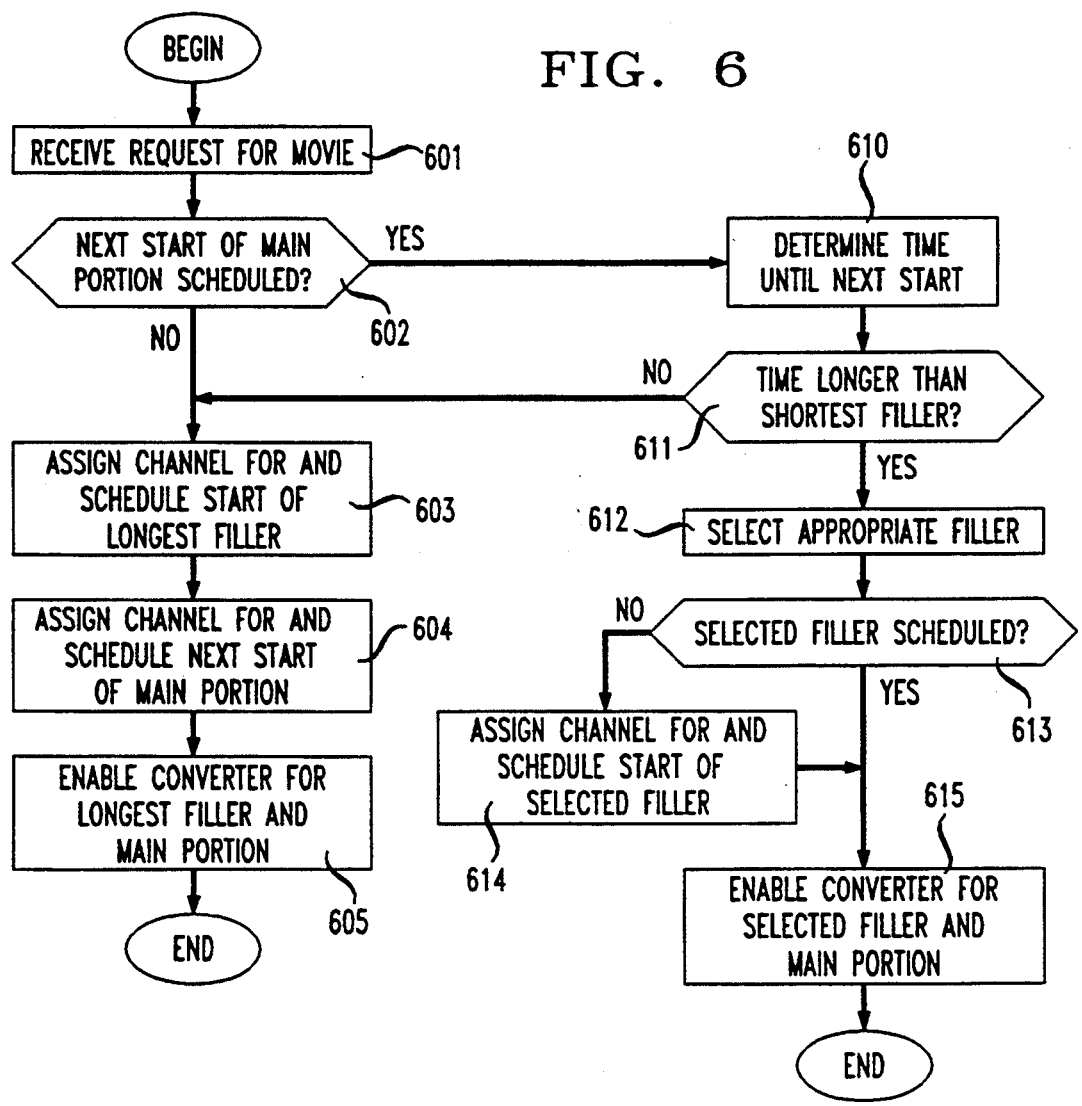
FIG. 6 is a flow chart showing the operation of ITV server/20 in FIG. 1 in scheduling program segments in one embodiment of the invention.

FIG. 6 is a flow chart showing the operation of ITV server 120 in FIG. 1 on receipt of a request for a movie to be run at different starting times and with different-length fillers as described above. On receipt of a request for the movie (block 601), if the next start of the main position of the movie has not been scheduled (block 602), a virtual channel is assigned to the longest filler and a starting time for such filler is scheduled (block 603). Then a virtual channel is assigned and a next starting time for the main portion of the movie is scheduled to coincide with the time the longest filler ends (block 604). Finally, the converter from which the request originated is enabled to receive the virtual channels to which the longest filler and the next start of the main portion have been assigned. The longest filler can be scheduled to begin immediately, but it may be desirable to wait a short interval to catch additional requests so that such filler is not run for just one subscriber.

If an additional request is received before the main portion starts, the time remaining until such start is determined (block 610) and, if the time is longer than the shortest filler (block 611 ), the longest filler that will fit in such remaining time is selected (block 612). If the selected filler has not already been scheduled (block 613), then a virtual channel is assigned to such filler and a starting time scheduled (block 614). Such starting time is chosen so that the filler ends when the main portion begins. Then, the requesting converter is enabled to receive the virtual channels to which the selected filler and the next start of the main portion have been assigned (block 615).

If an additional request arrives too late for the shortest filler to run before the next start of the main portion (block 611), then new starts of the longest filler and the main portion are scheduled and new virtual channels assigned (blocks 603, 604 and 605). As mentioned above, it may be desirable to delay the start of the longest filler for a short interval to catch more requests. Such delay should be no more than the difference in running time between the longest filler and the next longest; for example, the delay can be thirty seconds if such difference is one minute.

When the running of a particular filler or the main portion has been completed, then the virtual channel used for such portion is disabled at all converters that were set to receive it by means of control messages sent to such converters and such virtual channels can then be reassigned. As can be seen, the number of virtual channels needed for multiple showings of the same movie at staggered times is reduced by the method described above.

The above-described technique can be used with more than one level of fillers, if desired, to cope with a large number of starting times but without a large number of simultaneous runnings of the main body of a movie. For example, a set of "fine" fillers such as described above having one-minute length differences (say two to seven minutes long) can be used in conjunction with a set of "coarse" fillers having five-minute differences (say five to fifteen minutes long). The possible combinations of one fine filler and one coarse filler range from seven to twenty-two minutes in length, and the main body of the movie will need to be restarter no more frequently than every fifteen minutes. Such technique will necessitate the assignment of three virtual channels for each subscriber: one for the fine filler, one for the coarse filler and one for the main body of the movie. It will be apparent that the filler times described above are merely exemplary and that other times can be used in accordance with the invention, if desired. All that is necessary is to have a combination of one or more fillers that, when taken together, substantially fill the time between a request and the next start of the main body of the movie.

In addition to using fillers at the start of a movie, the same techniques as described above can be used to insert fillers at preselected intermediate points in the movie to permit subscribers to interrupt their viewing and resume after a pause.

As mentioned above, another application of multicasting in accordance with the invention can be the transmission Of a television program with different audio signals for different subscribers, such as a movie with the sound track in different languages. The video portion of the movie can be transmitted over one virtual channel and each language version of the soundtrack can be transmitted on an additional virtual channel. Alternatively, the video portion and sound track in one language can be transmitted on a conventional cable channel and sound tracks in other languages on virtual channels. Since the bandwidth needed for audio is much less than that needed for a movie with both audio and video, the number of packets per unit time for such soundtrack will be less than that for the movie and more virtual channels for such soundtracks can be packed into one ITV channel. Note that in this particular application of multicasting two virtual channels are being used simultaneously, not sequentially, as in the applications described previously.

One skilled in the art will realize that combinations of different soundtracks, staggered starting times and/or sequences of program segments can be used in accordance with the methods of the invention, but that such combinations may require larger numbers of virtual channels.

The aspects of the invention have been described above mainly in the context of terrestrial cable television systems wherein the number of usable channels is augmented by virtual channels resulting from the transmission of digital packets in at least one of the conventional channels. However, the principles of the invention can be used in conjunction with other signal distribution systems in which signals are broadcast from a central location to multiple subscribers. For example, multichannel radio or television broadcasting systems could also make use of the invention, as could systems wherein signals are broadcast from satellites. All that is necessary is the ability to transmit control messages from the server to facilities dedicated to the subscriber, such as converter 200 at the subscriber location, able to receive one or more channels as prescribed by the control messages and to detect and decode the signals in such channels to recreate the appropriate audio, video or other signals for use by the subscriber.

The invention has been shown and described with reference to particular embodiments. However, it will be understood by those skilled in the art that various change may be made therein without departing from the spirit and scope of the invention.

What is claimed is:

1. A method of providing a tailored program via a multi-channel distribution network, the tailored program comprising a set of one or more program segments, the method comprising:
   (a) receiving a request for the tailored program at a central location;
   (b) in response to the request, transmitting from the central location at least one control message, the control message identifying a set of one or more tailored program channels over which the tailored program will be transmitted;

(c) transmitting the tailored program from the central location to the multi-channel distribution network on the set of one or more tailored program channels;

(d) receiving a request for a second tailored program at the central location, the second tailored program comprising a second set of one or more program segments, the second tailored program and the tailored program having a common program segment;

(e) identifying a set of one or more filler programs, the set of one or more filler programs being able to substantially fill a time difference, the time difference being an amount of time between a first time a first user requests to view the tailored program and a second time a second user requests to view the second tailored program; and (f) transmitting information to the multi-channel distribution network, the information identifying at least one channel on which the set of one or more filler programs will be transmitted and a channel on which the common program segment will be transmitted.

2. The method of claim 1 further comprising the steps of:

(a) transmitting the set of one or more filler programs on the at least one channel; and (b) transmitting the common program segment on the channel, wherein the first time and the second time are different and a device assøciated with the second user receives a substantially continuous signal from the second time until the second tailored program ends.

3. An apparatus for providing a tailored program via a multi-channel distribution network, the tailored program comprising a set of one or more program segments, the apparatus comprising:

(a) means for receiving a request for the tailored program at a central location;

(b) means for transmitting from the central location at least one control message, the control message identifying a set of one or more tailored program channels over which the tailored program will be transmitted;

(c) means for transmitting the tailored program from the central location to the multi-channel distribution network on the set of one or more tailored program channels;

(d) means for receiving a request for a second tailored program at the central location, the second tailored program comprising a second set of one or more program segments, the second tailored program and the tailored program having a common program segment;

(e) means for identifying a set of one or more filler programs, the set of one or more filler programs being able to substantially fill a time difference, the time difference being an amount of time between a first time a first user requests to view the tailored program and a second time a second user requests to view the second tailored program; and (f) means for transmitting information to the multi-channel distribution network, the information identifying at least one channel on which the set of one or more filler programs will be transmitted and a channel on which the common program segment will be transmitted.

4. The apparatus of claim 3 further comprising:

(a) means for transmitting the set of one or more filler programs on the at least one channel; and (b) means for transmitting the common program segment on the channel, wherein the first time and the second time are different and a device associated with the second user receives a substantially continuous signal from the second time until the second tailored program ends.

* * * * *